UNITED STATES PATENT OFFICE

2,833,812

CARBOXYLIC ACID ESTERS OF CIS-3,6,7-TRIMETHYL-2-OCTEN-1-OL

Joseph Donald Surmatis, Pompton Plains, N. J., assignor to Hoffmann-La Roche Inc., Nutley, N. J., a corporation of New Jersey No Drawing. Application October 14, 1954
Serial No. 462,359

4 Claims. (Cl. 260—476)

This invention relates to novel chemical compounds useful as odor-imparting agents, e. g. in the preparation of perfumes and of scented compositions generally, and to novel processes and novel intermediates useful in making such odor-imparting agents. More particularly, it relates to certain carboxylic acid esters of cis-3,6,7-trimethyl-2-octen-1-ol.

This application is a continuation-in-part of my copending application Serial No. 453,684, filed September 1, 1954, now abandoned.

One process for making the compounds of the invention is illustrated graphically in the following chart:

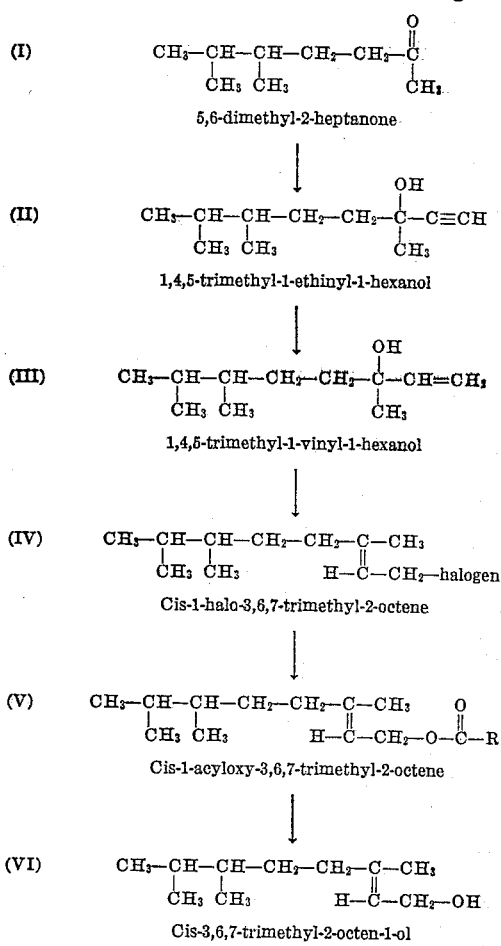

In the formulas shown in the above chart,

represents a carbonylic acyl radical of an organic carboxylic acid; preferably one in which R represents a monovalent hydrocarbon radical, and still more preferably one in which R represents an alkyl or cycloalkyl or monocyclic aryl hydrocarbon radical. For example,

can represent alkanoyl, such as acetyl or palmitoyl; or monocyclic hydrocarbon aroyl, such as benzoyl or toluoyl.

In the process of preparation illustrated above, the starting material of the invention is the known compound, 5,6-dimethyl-2-heptanone (I). This process comprises ethinylating (I) by reacting with acetylene in liquid ammonia to produce 1,4,5-trimethyl-1-ethinyl-1-hexanol (II); partially hydrogenating the latter by reaction with elemental hydrogen in the presence of a selective reduction catalyst to produce 1,4,5-trimethyl-1-vinyl-1-hexanol (III); halogenating the latter (e. g. by treating with a phosphorus trihalide or with a concentrated aqueous solution of a hyrohalic acid) to produce cis-1-halo-3,6,7-trimethyl-2-octene, preferably by treating (III) with commercial concentrated aqueous hydrochloric acid of approximately 37% by weight concentration or commercial concentrated aqueous hydrobromic acid of approximately 48% by weight concentration; exchanging the 1-halo substituent of (IV) for an acyloxy radical

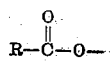

wherein

has the meaning stated above, for instance by reacting (IV) with an alkali metal salt of the particular acid, e. g.

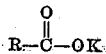

or

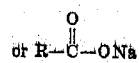

to produce cis-1-acyloxy-3,6,7-trimethyl-2-octene (V); and hydrolyzing (V) to yield cis-3,6,7-trimethyl-2-octen-1-ol (VI) e. g. by saponifying with aqueous-alcoholic potassium hydroxide solution.

In addition to the method disclosed above for making the novel odor-imparting agents designated by the nomenclature cis-1-acyloxy-3,6,7-trimethyl-2-octene, Formula V, an alternative method comprises directly esterifying cis-3,6,7-trimethyl-2-octen-1-ol with an acylating agent appropriate to introduce the acyl radical of the desired acid, such acylating agents including the acids themselves, their halides and their anhydrides. A preferred group of odor-imparting agents among those compounds of the invention having Formula V above comprises those esters wherein R represents hydrogen or a hydrocarbon radical having not more than seven carbon atoms, e. g. a lower alkyl radical such as methyl, ethyl, isobutyl, n-heptyl and the like; or a cycloalkyl radical such as cyclohexyl or cyclopentyl, or a hydrocarbon aryl radical such as phenyl or tolyl. Esters of this class, wherein the acyl radical contains not more than eight carbon atoms and consists of carbon and hydrogen atoms only, exclusive of a single oxygen atom contained in a carbonyl group, are especially valuable as odor-imparting agents for use in compounding perfumes and scented compositions.

The term "cis," as used in this specification, signifies a steric configuration analogous to that of geraniol, i. e. a configuration such that in the 2-octene derivatives described herein, the hydrogen atom attached to the number 2 carbon atom and the 3,4-dimethyl-1-pentanyl radical attached to the number 3 carbon atom can be considered as lying on the same side of a plane passed through the rigid olefinic linkage connecting said carbon atoms. Conversely, the hydroxymethyl group (or esterified hydroxymethyl group) attached to the number 2 carbon atom and the methyl group attached to the number 3 carbon atom can be considered as both lying on the opposite side of said above-mentioned plane, see Formulas IV, V and VI in the preceding chart.

The invention is further disclosed in the following examples, which are illustrative but not limitative thereof:

Example 1

193 g. of metallic sodium were cut into small pieces of approximately 0.25 g. and dissolved in 7 liters of liquid ammonia. Acetylene gas was bubbled into the stirred solution until the color turned from a deep blue to white. 1000 g. of 5,6-dimethyl-2-heptanone were dissolved in an equal volume of diethyl ether and dropped into the stirred reaction mixture in one hour. Stirring was continued for three hours longer while a slow stream of acetylene was bubbled in. The acetylene addition was then stopped, but stirring was continued all night. The ammonia was then distilled off under a slow stream of nitrogen, and the residue in the flask was quenched with 5 liters of 5% aqueous sulfuric acid. The product was water washed and fractionated. There were obtained 976 g. of 1,4,5-trimethyl-1-ethinyl-1-hexanol; B. P. 91° C./10 mm., $n_D^{25}=1.4452$.

Example 2

976 g. of 1,4,5-trimethyl-1-ethinyl-1-hexanol, 1 liter of petroleum ether and 100 g. of lead-palladium catalyst on calcium carbonate [Lindlar, Helvetica Chimica Acta 35, 446 (1952)] were stirred in a hydrogenation vessel until hydrogen uptake stopped. 5.8 mols of hydrogen were consumed. On fractionation, there were obtained 912 g. of 1,4,5-trimethyl-1-vinyl-1-hexanol; B. P. 89° C./10 mm., $n_D^{25}=1.4440$.

Example 3

255 g. of 1,4,5-trimethyl-1-vinyl-1-hexanol and 600 cc. of 48% hydrobromic acid were stirred at 15° C. for one hour. The oil layer was removed by means of a separatory funnel and washed three times, each time with 200 cc. of water. After drying over calcium chloride, 348 g. of cis-1-bromo-3,6,7-trimethyl-2-octene were obtained, $n_D^{25}=1.472$.

Example 4

The total quantity of cis-1-bromo-3,6,7-trimethyl-2-octene as obtained from Example 3 was refluxed for twenty-four hours together with 3 liters of acetone and 400 g. of potassium acetate. Most of the acetone was removed by distillation. The residue was taken up in 1 liter of water. The oil layer was removed with a separatory funnel and dried over anhydrous calcium sulfate. There were obtained 104 g. of cis-1-acetoxy-3,6,7-trimethyl-2-octene, distilling at 116° C./20 mm., $n_D^{25}=1.446$. This compound has a fragrance reminiscent of roses, and is useful as an odor-imparting agent.

Example 5

To a solution of 50 g. of cis-1-acetoxy-3,6,7-trimethyl-2-octene in 500 cc. of ethyl alcohol, there were added 125 g. of a 20% aqueous potassium hydroxide solution. The reaction mixture was stirred for two hours at 50° C. The mixture was diluted with 1 liter of water and extracted twice, each time with 200 cc. of petroleum ether. The petroleum ether extract was washed neutral with water and dried over anhydrous calcium sulfate. On fractionation, there were obtained 42 g. of cis-3,6,7-trimethyl-2-octen-1-ol, distilling at 121° C./18 mm., $n_D^{25}=1.457$. This compound has a rose-like fragrance, and is useful as an odor-imparting agent.

Example 6

A solution of 85 g. of cis-3,6,7-trimethyl-2-octen-1-ol, 100 g. of formic acid and 400 cc. of n-heptane was stirred at reflux temperature for two hours. The reaction mixture was washed with 500 cc. of water, 500 cc. of 5% aqueous sodium bicarbonate solution and finally with 500 cc. of water. The resulting oil was dried over anhydrous calcium sulfate and fractionated. Cis-1-formyloxy-3,6,7-trimethyl-2-octene distilled at 130° C. at 45 mm., $n_D^{25}=1.449$. It has a pleasant fragrance reminiscent of roses, and is useful as an odor-imparting agent.

Example 7

34 g. of cis-3,6,7-trimethyl-2-octen-1-ol, 100 cc. of pyridine and 48 g. of isobutyric anhydride were placed in a flask which was provided with a stirrer, thermometer and heating bath, and stirred at 60° C. for four hours. The reaction mixture was washed with 500 cc. of water, 200 cc. of 5% aqueous sulfuric acid, 200 cc. of 5% aqueous sodium carbonate, and finally with 200 cc. of water. The resulting oil was then dried over anhydrous calcium sulfate and fractionated. Cis-1-isobutyroxy-3,6,7-trimethyl-2-octene boiled at 106° C. at 1.5 mm., $n_D^{25}=1.4455$. It has a pleasant fragrance reminiscent of roses, but with fruity and musk accents. It is useful as an odor-imparting agent.

Example 8

85 g. of cis-3,6,7-trimethyl-2-octen-1-ol and 100 cc. of pyridine were placed in a flask provided with a stirrer and a thermometer. 70 g. of benzoyl chloride was dropped in within 15 minutes. The temperature was allowed to rise to 80° C., then stirring was continued until the mixture cooled to room temperature. The reaction mixture was washed with 500 cc. of water, 500 cc. of 5% aqueous sulfuric acid, 500 cc. of 5% aqueous sodium carbonate and 500 cc. of water. The resulting oil was dried and fractionated. The product, cis-1-benzoyloxy-3,6,7-trimethyl-2-octene, distilled at 136° C. at 0.3 mm., $n_D^{25}=1.501$. It has a faint rose-like fragrance, and is useful as an odor-imparting agent.

Example 9

170 g. of 1,4,5-trimethyl-1-vinyl-1-hexanol and 500 cc. of concentrated aqueous hydrochloric acid (37% by weight HCl) were stirred for one hour at room temperature. The oil layer was then separated, washed twice with 500 cc. of water and dried over calcium chloride. The resulting cis-1-chloro-3,6,7-trimethyl-2-octene was used without purification in Example 10 below.

Example 10

The entire amount of cis-1-chloro-3,6,7-trimethyl-2-octene prepared in Example 9 was refluxed for 60 hours with 2 liters of acetone and 300 g. of anhydrous potassium acetate. Most of the acetone was removed by distillation under vacuum. The residue was taken up in one liter of water. The oil which separated was removed by means of a separatory funnel, and washed neutral and dried. On fractionation of the dried oil, cis-1-acetoxy-3,6,7-trimethyl-2-octene was obtained, distilling at 126° C. at 38 mm., $n_D^{25}=1.446–1.447$.

I claim:

1. Cis-1-acyloxy-3,6,7-trimethyl-2-octene wherein the acyl radical contains not more than eight carbon atoms and consists of carbon and hydrogen atoms only, exclusive of a single oxygen atom contained in a carbonyl group.
2. Cis-1-lower alkanoyloxy-3,6,7-trimethyl-2-octene.
3. Cis-1-isobutyroxy3,6,7-trimethyl-2-octene.
4. Cis-1-benzoyloxy-3,6,7-trimethyl-2-octene.

(References on following page)

References Cited in the file of this patent

UNITED STATES PATENTS

| | | |
|---|---|---|
| 2,434,394 | Cheney et al. | Jan. 13, 1948 |
| 2,555,598 | Newman | June 5, 1951 |
| 2,555,989 | Newman | June 5, 1951 |
| 2,583,426 | Hillyer et al. | Jan. 22, 1952 |
| 2,683,179 | Anspon | July 6, 1954 |
| 2,689,873 | Niederhauser | Sept. 21, 1954 |

OTHER REFERENCES

Locquin et al.: Compt. Rend. 174 (1922), pp. 1711–3.
Braun et al.: Ber. Deut. Chem. 57B (1924), 381–2.
Karrer et al.: Helv. Chim. Acta 23 (1940), pp. 581–4.
Simonsen et al.: "The Terpenes," vol. I (1953), pp. 63–64.